H. D. GRINNELL.
ELECTRIC GAS LIGHTER.
APPLICATION FILED JULY 14, 1910.
1,010,897.
Patented Dec. 5, 1911.
2 SHEETS—SHEET 1.
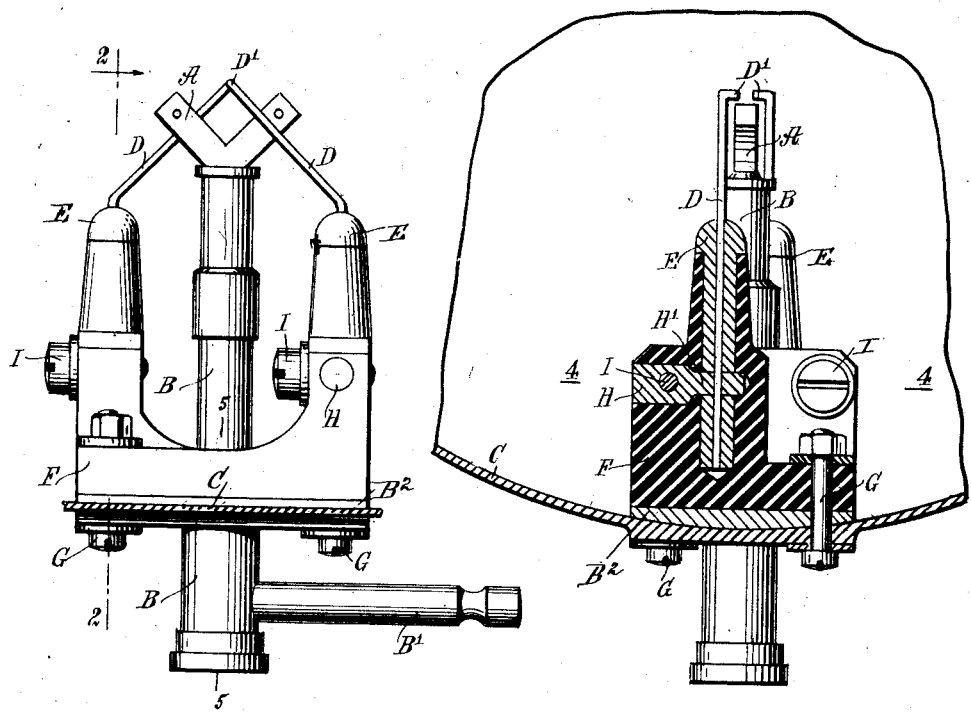
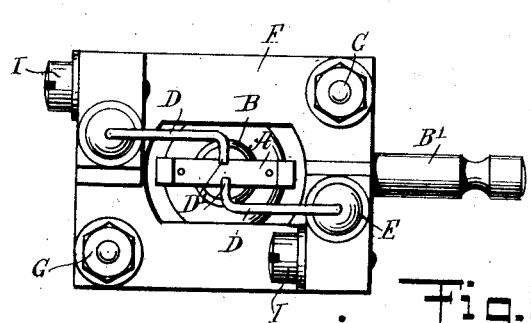
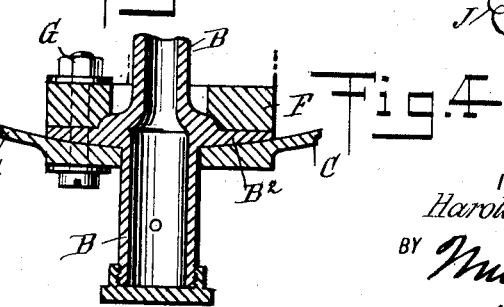
WITNESSES:
INVENTOR
Harold D. Grinnell
BY
ATTORNEYS

H. D. GRINNELL.
ELECTRIC GAS LIGHTER.
APPLICATION FILED JULY 14, 1910.

1,010,897.

Patented Dec. 5, 1911.

2 SHEETS—SHEET 2.

WITNESSES:

INVENTOR
Harold D. Grinnell
BY
ATTORNEYS

UNITED STATES PATENT OFFICE.

HAROLD DUNCAN GRINNELL, OF PITTSFIELD, MASSACHUSETTS.

ELECTRIC GAS-LIGHTER.

1,010,897.  Specification of Letters Patent.  Patented Dec. 5, 1911.

Application filed July 14, 1910.  Serial No. 571,910.

*To all whom it may concern:*

Be it known that I, HAROLD D. GRINNELL, a citizen of the United States, and a resident of Pittsfield, in the county of Berkshire and State of Massachusetts, have invented a new and Improved Electric Gas-Lighter, of which the following is a full, clear, and exact description.

The object of the invention is to provide a new and improved electric gas lighter, designed for use on motor vehicle lamps and other lamps, and having the sparking electrodes so placed that the spark ignites the diffused gas issuing from the burner, without the spark being subjected to the gas pressure and without the points of the sparking electrodes being within the flame or subjected to the intense heat thereof.

For the purpose mentioned, the points of the sparking electrodes are arranged below the center of the flame of the lamp, so that only a diffused portion of the gas issuing from the lamp burner is ignited by the spark passing between the points of the sparking electrodes.

A practical embodiment of the invention is represented in the accompanying drawings forming a part of this specification, in which similar characters of reference indicate corresponding parts in all the views.

Figure 6:
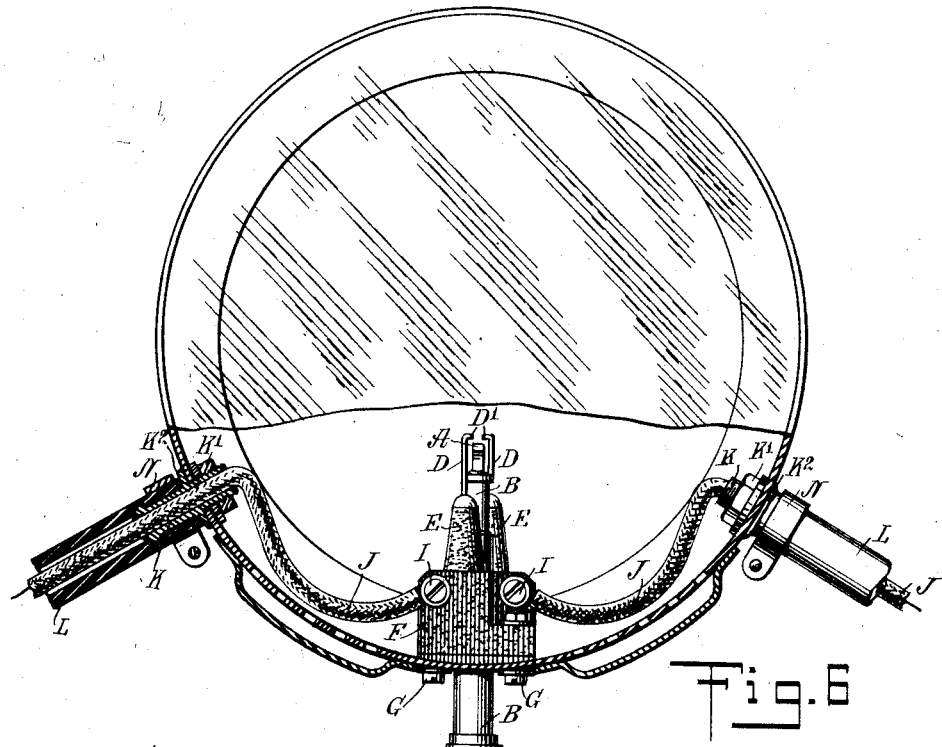
Figure 7:
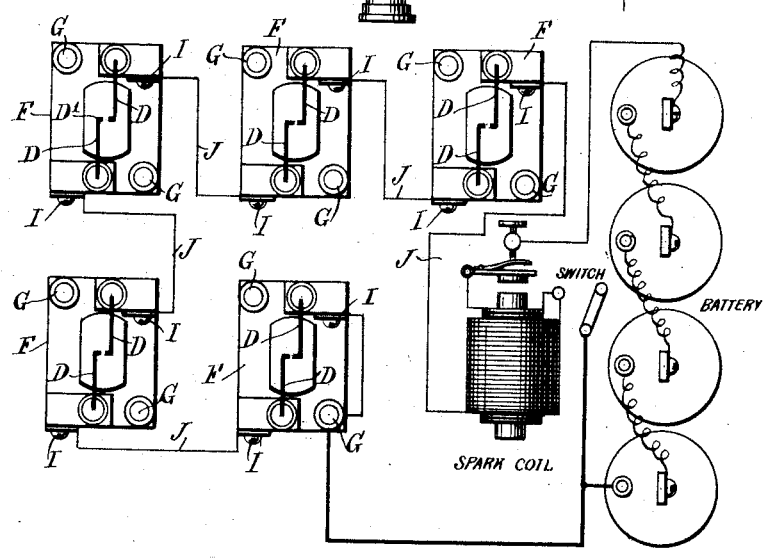

Figure 1 is a side elevation of the electric gas lighter as applied to a Y-shaped burner; Fig. 2 is a transverse section of the same on the line 2—2 of Fig. 1; Fig. 3 is a plan view of the same; Fig. 4 is a sectional plan view of the same on the line 4—4 of Fig. 2; Fig. 5 is a cross section of the same on the line 5—5 of Fig. 1; Fig. 6 is a sectional front elevation of a motor vehicle lamp provided with the electric gas lighter; and Fig. 7 is a diagrammatic view showing the electric gas lighters wired in series.

The gas burner A shown in the drawings is of Y shape and such as is generally used for burning acetylene gas, and the burner A is attached to the upper end of the gas supply pipe B extending through the bottom of the lamp casing C, to connect at the outside of the casing C by a nipple B' and rubber hose with a gas supply.

The points D' of the sparking electrodes D are arranged between the arms of the burner A, as plainly indicated in Figs. 1, 2 and 3, and are located below the center of the flame of the lamp, so that only a diffused portion of the gas issuing from the burner A is ignited by the spark passing between the points D' of the sparking electrodes D. It is understood that by the arrangement described, the spark is immediately below the point where the two streams of gas issuing from the burner arms meet, and as the gas is diffused in a downward direction it is readily ignited by the spark passing between the points D', and hence the spark is not subjected to the gas pressure, and the risk of extinguishing the spark by the pressure of the gas is reduced to a minimum, at the same time the points D' are protected from the intense heat of the ignited gas and hence are not liable to be damaged.

The sparking electrodes D are set with their vertical portions into the bores of metallic bushings E, embedded in a base F, of a suitable insulating material such as hard rubber, mica, porcelain or the like, and the said base F is secured by bolts G to the casing C, the bolts also serving to fasten the flange $B^2$ of the gas supply pipe B in position on the casing C.

The metallic bushings E are intersected by the reduced inner ends H' of plugs H, embedded in the base F and engaged by binding posts I held on the base F and facing the front of the lamp, so as to permit of convenient access to the said binding posts I and the secondary wires J connected with the said binding posts.

The insulated secondary wires J extend loosely through tubular holders K, fastened by nuts K' and collars $K^2$ to the wall of the casing C at the sides thereof, as plainly indicated in Fig. 6, and the outer ends of the holders K are engaged by rubber tubes L through which extend the secondary wires J, to project the same. The ends of the rubber tubes L are clamped in position on the outer ends of the tubular holders K by suitable clamps N, to prevent accidental detachment of the tubes L from the holders K. From the foregoing it will be seen that by the arrangement described the secondary wires J are independently supported of the base F and the parts carried thereby, it being only necessary to attach the terminals of the secondary wires to the binding ports I. It will also be seen that the bushings E are located on opposite sides of the central opening arranged in the base F and through which passes the supply pipe B, so that the sparking electrodes D can be readily placed in position without interference with the burner A, and the burner can be changed, if desired, without interfering with the electrodes D. By arranging the binding posts I inside of the lamp casing C, they are completely protected from all moisture, and hence short circuiting is not liable to take place. The ends of the openings in the tubular holders K are preferably made bell shape, so as to prevent the insulation of the secondary wires J from being chafed and cut.

As indicated in Fig. 6, the lamps may be wired in series up to the full capacity of the spark gap for which the coil used is designed.

The electric lighter may be used either with oil wick lamps or with gas lamps, or with a series of both.

Having thus described my invention, I claim as new and desire to secure by Letters Patent:

1. An electric lighter for lamps, comprising a base of insulating material and having an opening for the passage of the burner pipe, metallic bushings set in the said base, transverse plugs held in the said base and engaging the said bushings, sparking electrodes held in the said bushings and plugs, and binding posts held on the said base engaging the said plugs.

2. An electric lighter for lamps, comprising a base of insulating material and having a central opening for the passage of the burner pipe and recesses on the opposite sides of the said central opening, metallic bushings set in the said recesses and provided with openings intersecting the bores of the bushings, plugs held on the said base and extending into the said bushing openings, the plugs having holes in register with the said bushing bores, sparking electrodes held in the said bushing bores and passing through the said plug holes, and binding posts held on the said base and engaging the said plugs.

3. In combination, a lamp casing, a burner extending through the bottom of the casing into the interior of the casing, the burner having a flange engaging the casing, a base of insulating material secured to the said casing bottom and provided with a central opening for the passage of the burner pipe, metallic bushings held on the said base, plugs held on the said base and intersecting the said bushings, sparking electrodes held in the said bushings and engaging the said plugs, binding posts held on the front of the said base and engaging the said plugs, and fastening means engaging the said casing, burner flange and base, to fasten the parts in position.

4. In combination, a lamp casing, a burner extending through the bottom of the casing into the interior of the casing, the burner having a flange engaging the casing, a base of insulating material secured to the said casing bottom and provided with a central opening for the passage of the burner pipe, metallic bushings held on the said base, and intersecting the said bushings, sparking electrodes held in the said bushings and engaging the said plugs, binding posts held on the front of the said base and engaging the said plugs, fastening means engaging the said casing, burner flange and base, to fasten the parts in position, tubular holders projecting through and secured to the sides of the said casing, and secondary wires passing through the said holders and connected with the said binding posts.

5. In combination, a lamp casing, a burner extending through the bottom of the casing into the interior of the casing, the burner having a flange engaging the casing, a base of insulating material secured to the said casing bottom and provided with a central opening for the passage of the burner pipe, metallic bushings held on the said base, plugs held on the said base and intersecting the said bushings, sparking electrodes held in the said bushings and engaging the said plugs, binding posts held on the front of the said base and engaging the said plugs, fastening means engaging the said casing, burner plugs and base, to fasten the parts in position, tubular holders projecting through and secured to the sides of the said casing, secondary wires passing through the said holders and connected with the said binding posts, rubber tubes engaging the outer end of the said holders for the passage of the said secondary wires, and clamps engaging the said rubber tubes for clamping the same in place on the said holders.

In testimony whereof I have signed my name to this specification in the presence of two subscribing witnesses.

HAROLD DUNCAN GRINNELL.

Witnesses:
 JOHN BARKER,
 WALTER L. BLAIN.

---

Copies of this patent may be obtained for five cents each, by addressing the "Commissioner of Patents, Washington, D. C."